Figure 1:
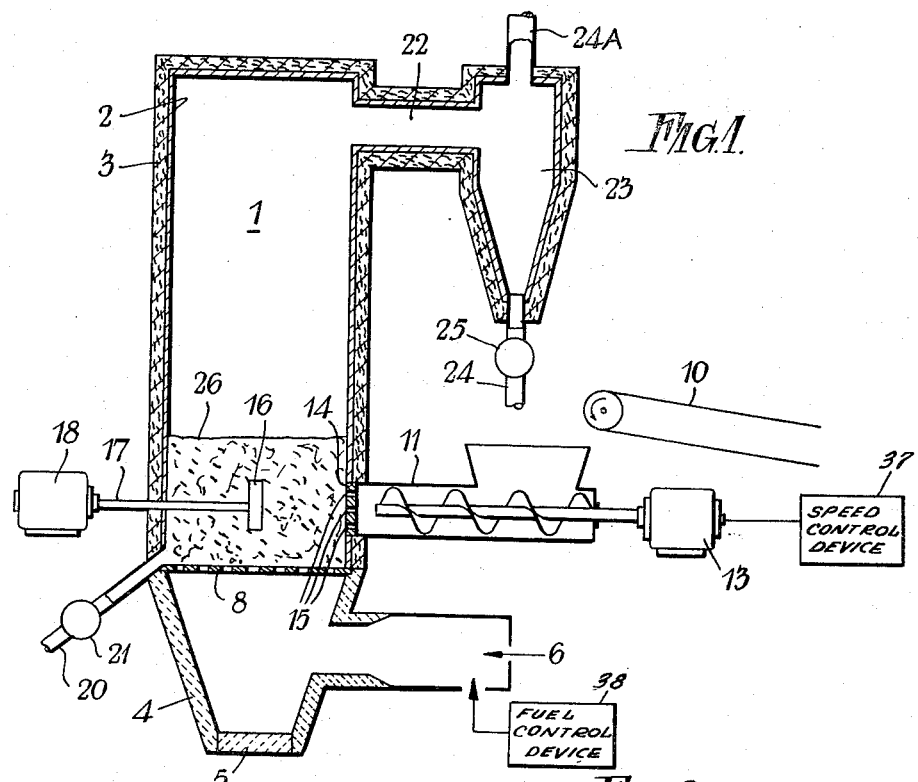

June 1, 1965 R. E. BROCINER ET AL 3,186,102
METHOD OF DRYING AN INSOLUBLE PARTICULATE MATERIAL
Filed June 2, 1960
2 Sheets-Sheet 1

United States Patent Office 3,186,102
Patented June 1, 1965

3,186,102
METHOD OF DRYING AN INSOLUBLE
PARTICULATE MATERIAL
Ronald Eric Brociner and Victor Hubert Miller, St. Austell, Cornwall, England, assignors to English Clays Lovering Pochin & Company Limited, St. Austell, England, a British company
Filed June 2, 1960, Ser. No. 36,700
Claims priority, application Great Britain, June 2, 1959, 18,870/59
7 Claims. (Cl. 34—10)

This invention relates to a method of drying an insoluble particulate material. The expression "particulate material" is intended to mean a material consisting of individual particles having a mean size less than 52 microns. The substance to be dried, that is to say the particles and the fluid to be removed from them, will be in the form of a liquid, a paste or a dough.

The invention is particularly applicable to the drying of kaolin and ball clays and it is believed that it can also be applied to the drying of other insoluble particulate materials, including calcium carbonate.

According to the invention there is provided a method of drying an insoluble particulate material, wherein the insoluble material, with the fluid to be removed therefrom, is directly introduced into a chamber in the form of a liquid or in the form of a paste or a dough, and wherein the liquid, paste or dough is broken up into small portions which are sustained in a turbulent state by a rising stream of hot gas and are at the same time dried by the hot gas.

The fluid to be removed from the particulate material will usually, but not necessarily, be water.

The gas may be already hot when it is supplied to the chamber or it may be cool, in which case it will be heated in the chamber itself by means of a heat exchanger placed in or below the turbulent mass. If necessary, the gas could be dried by means of a desiccant before being supplied to the chamber.

In the case where the material to be dried and the fluid to be removed are in liquid form, that is to say in the form of a suspension of the small particles in the fluid, the liquid is preferably introduced into the chamber through a disintegrating nozzle so that it is broken up into portions, that is to say droplets, as it enters the chamber, whereupon the droplets soon become solid granules. Where, however, the substance supplied to the chamber is more viscous and is in the form of a paste or a dough, it is preferably extruded through small orifices and supplied to the chamber in the form of long strings, rather like spaghetti. The strings may then be broken into small portions or granules by the action of the hot gas alone, which at first partially dries the material so that the strings become brittle and break into pieces under their own weight and the effect of the gas pressure and of bombardment by broken-off pieces already in the chamber. Preferably, however, the breaking-up of the strings is promoted by the use of a mechanical device in the chamber which strikes the strings and cuts or shatters them.

The conditions in the chamber are those which are characteristic of a so-called "fluidized bed." The technique of "fluidization" or establishing a "fluidized bed" has recently become well known and has been the subject of several books, including, for example, "fluidization" by D. F. Othmer (Reinhold Publishing Corporation of New York). Briefly, a "fluidized bed" results when a gas is caused to flow upward through a bed of suitably sized solid particles at a velocity sufficiently high to buoy the particles and to impart to them a violently turbulent motion, like that of a boiling liquid. The velocity of the gas must be intermediate between the velocity which will just result in the particle bed being buoyed and the velocity which will result in the particles being swept out of the chamber.

Examples in accordance with the invention are described below with reference to the removal of water from china clay. If the clay and water are in the form of a paste or a dough, this may be the substance obtained as the output of a filter-press or a vacuum filter. Whether the clay and water mixture is in the form of a paste or a dough (i.e. a flocculated suspension of clay in water, that is to say one where the individual particles are held in flocks or large loosely bound agglomerates by inter-particulate forces) or in the form of a liquid (i.e. a deflocculated suspension, that is to say one where there is no flocking or grouping of the individual particles into larger masses), the solids content will be between 40% and 80% by weight, usually between 55% and 75% by weight. If the clay and water are in liquid form, the water may contain tetrasodium pyrophosphate as deflocculant or a substance having a similar effect, for example sodium silicate or Calgon.

One of the disadvantages of the known methods of drying clay is that the product contains fine powder or dust which is objectionable to handle in bulk. Use of the present invention yields a mass of larger granules, for example of the size of a small pea, which can be transported without excessive dusting. The customer can easily reduce the granules to powder if he so wishes.

Figure 2:
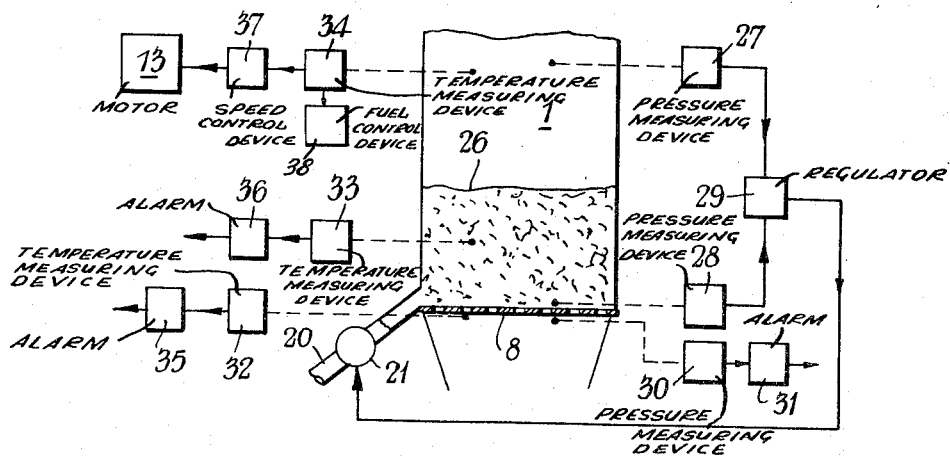
Figure 3:
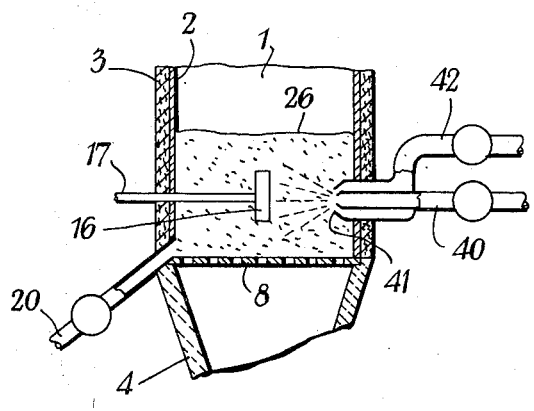
Figure 4:
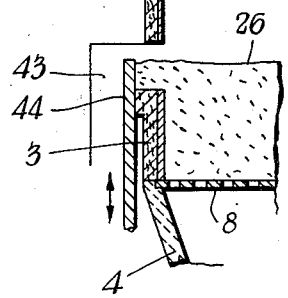

For a better understanding of the invention and to show how the same may be carried into effect, reference will now be made to the accompanying drawings in which:

FIGURE 1 represents an apparatus for drying clay,
FIGURE 2 diagrammatically represents an automatic control system for controlling the process carried out in the apparatus of FIGURE 1, and
FIGURES 3 and 4 are of parts of the apparatus and they show possible modifications thereof.

Referring to FIGURE 1, the apparatus includes a chamber 1 consisting of a metal cylinder 2 surrounded by heat-insulating lagging 3. At the bottom of the chamber there is a frusto-conical base 4 lined with firebrick, the base having a cover 5 which can be removed for cleaning purposes. A combustion chamber 6 is connected to the side of the base 4 and to it are supplied fuel and air, as represented by the arrows marked 6 and 7. The air is blown in by a suitable fan. The hot gases generated by the combustion of the fuel flow (at a substantial velocity, owing to the fan) into the base 4 and then into the chamber 1 by way of holes in a distribution grid 8, which consists of a perforated plate made of heat-resisting material. The gas temperature may be about 800° C.

A conveyor belt 10 feeds the material to be dried, in the form of a paste or a dough, into an extruder 11 driven by a motor 13. The interior of the extruder communicates with the chamber 1 by way of a plate 14 formed with orifices 15 which may, for example, have a diameter of between $\frac{1}{32}$ inch and $\frac{1}{4}$ inch. A stirring device is disposed in the chamber near the plate 14, consisting of a blade 16 centrally fixed to one end of a rod 17 that is rotated about its axis by a motor 18.

A discharge pipe 20, through which the dried clay can be removed, extends from the region of the chamber just above the distributor grid 8. An on-off control valve 21 is provided in this pipe to control the discharge of clay granules through it.

A gas discharge duct 22 carries the gas, together with any powdered clay taken with it, into a cyclone separator 23, from which the gas flows through a pipe 24A to the atmosphere, or to a filter, and the powdered clay is returned to the extruder 11 by way of a pipe 24 fitted with a control valve 25.

In the operation of the apparatus, the paste or dough is extruded through the orifices in the plate 14 in the form of long strings, rather like spaghetti. The strings are soon partially dried by the hot gases in the chamber 1 and they become brittle. If they do not break before reaching the rotating blade 16, they are broken by the latter with the result that a mass of partially dried granules is continually being added to the granules already in the chamber. The gas velocity is such that the mass of particles is fluidized and the gas, being hot, dries the granules. The upper surface of the fluidized bed is indicated at 26. Dried granules are taken off through the discharge pipe 20.

The manner in which the operating conditions may be controlled is diagrammatically illustrated in FIGURE 2. The gas pressure at the top and bottom off the fluidized bed is measured by pressure measuring devices 27 and 28. These devices convey signals to a regulator 29 which compares the two pressure readings and controls the valve 21 in accordance with the difference between the two readings, that is to say in accordance with the pressure drop across the fluidized bed. This pressure drop increases with an increase in the depth of the fluidized bed. The controller 29 operates the on/off valve 21 in such manner that when the measured pressure drop rises to a value slightly above the nominal pressure drop the valve opens and when the measured pressure drop falls to a value slightly below the nominal value the valve closes. When the measured pressure drop is equal to the nominal value, the valve may be in the open condition or in the closed condition, according to circumstances. In this way, the depth of the bed is maintained approximately constant. The gas pressure beneath the grid 8 is also supervised by a supervisory device 30 which operates a warning and switch-off device 31 if the gas pressure below the grid 8 rises unduly owing to some form of blockage in or above the grid.

Temperature-measuring devices 32, 33 and 34 are provided to measure the temperature below the grid 8, in the fluidized bed and in the path of the gases leaving the fluidized bed.

The measuring devices 32 and 33 are coupled to controllers 35 and 36, which are safety devices that function to sound a warning bell, if the measured temperature is above or below a prescribed range.

Coupled to the measuring device 34 is a controller 37 that controls, in dependence upon the exhaust gas temperature, the speed of the motor 13 which drives the extruder 11. To explain this method of control, it may be stated that the velocity of the incoming gas must be within narrow limits, which depend upon the range of sizes of the granules in the fluidized bed. If the inlet gas temperature is also to be kept substantially constant, as is proposed, the rate of heat input to the fluidized bed is thus substantially constant. The exhaust gas temperature will thus depend largely upon the quantity of free water in the material in the fluidized bed, which water can absorb heat from the uprising gas because of the latent heat of evaporation of the water. (Some of the heat from the gas is also absorbed by the clay itself.) If the exhaust gas temperature rises above what is considered to be the correct value, the action of the parts 34 and 37 on the motor 13 results in an increase in the rate of feed of the paste or dough, the effect of this being to restore the exhaust gas temperature to its optimum value.

The temperature measuring device 34 could, as an alternative, act upon a fuel control device 38 which controls the rate of fuel input to the combustion chamber, in which case the rate of infeed of the paste or dough would be kept constant. With this method of control, if the exhaust gas temperature rises above the optimum value, the fuel input valve is closed further.

In either case, if the temperature of the exhaust gas is kept below 100° C., it is possible to obtain from the chamber 1 a product which is not completely dry but has a controlled amount of moisture therein, the control being exerted by the controller 37.

In a small-scale experimental apparatus which we have operated, the holes through the distribution grid 8 were about ⅛ inch diameter, with rather larger intervals between the holes. This size of hole is likely to be suitable for apparatus operating on a commercial scale. The holes 15 through the plate 14 may be of two or more different sizes, for example $\frac{1}{16}$ inch diameter and $\frac{3}{32}$ inch diameter, in order to obtain the requisite range of granule sizes in the fluidized bed.

A piston could be used, instead of the illustrated form of extruder, for forcing the wet clay through the holes in the plate 14. If desired, the wet material may be extruded into the fluidized bed at several places.

If the clay and water to be dried is in the liquid (deflocculated) state, it is possible to mix with it a quantity of clay that has already been dried and so to obtain a thicker and paste-like (but deflocculated) suspension of clay in water. This may then be extruded into the chamber and dried in the manner described above. Alternatively, the deflocculated liquid may be dried in the manner described below with reference to FIGURE 3. This figure shows part of an apparatus similar to that of FIGURE 1 but with the parts 11 to 15 replaced by an air disintegrating nozzle, in which a stream of the liquid flowing through a pipe 40 and a nozzle 41 into the fluidized bed is broken up into small droplets by the action of a stream of air flowing through a pipe 42. More than one nozzle may be used if desired.

Whether an extruder or a nozzle is used, the rod 17 of the stirring device may be vertically arranged and the blade 16 may be horizontal. Also, instead of using a pipe 20, controlled by a valve 21, to remove the dried clay granules, there may be employed a vertical shaft bounded on one side by a vertically movable weir plate, as shown in FIGURE 4, where 43 represents the shaft and 44 the weir plate. The height of the fluidized bed could then be controlled by adjustment of the vertical position of the weir plate 44. The outlet to the shaft would be sealed by a suitable gas seal, such as a rotary valve, which permits the dried product to be taken off through the shaft.

What is claimed is:

1. A method of drying a suspension of an insoluble, solid particulate material in a liquid to obtain dry granules composed of particles of said material, said method comprising forming a fluidized bed constituted of drying granules of said material by upwardly passing heated gas through said granules to hold said granules suspended in the form of a turbulent mass and wherein the turbulent mass has upper and lower boundaries, causing said suspension to flow in the form of a continuous stream towards said mass in the fluidized bed substantially normal to the upwardly flowing gas at a level between the upper and lower boundaries of the mass and thereby not disturb the boundaries of the mass, extruding the stream into a plurality of small strings just as the stream enters the fluidized bed, the strings having a tendency to dry and break apart into particles in the bed, promoting the breakage of the strings by mechanically engaging the strings within the bed, and permitting said particles to mix with said drying granules thereby to provide further drying granules as the particles of said material in said strings are dried by said gas and continuously removing drying granules which are substantially dust-free from the fluidized bed at the lower boundary of the bed and at approximately the same rate at which the particles in the strings are introduced into said bed to retain a substantially constant mass of drying granules in said fluidized bed, the strings of the divided stream being the only source of particulate material introduced into said bed.

2. A method according to claim 1, in which the strings have different cross-sectional areas.

3. A method according to claim 1 wherein a portion of the divided stream which is of dust size is carried from said fluidized bed by said gas, the method further comprising recovering said portion carried from said fluidized bed with said gas and adding the recovered material to the suspension awaiting treatment.

4. A method according to claim 1, which further comprises maintaining the height of said fluidized bed substantially constant by controlling the rate of removal of said dried granules in response to difference of the pressure of said gas above and below said fluidized bed.

5. A method according to claim 1, further comprising controlling the rate of flow of said stream to maintain the temperature of the gas above said fluidized bed substantially constant when the heat supplied to said fluidized bed is substantially constant.

6. A method according to claim 1, comprising maintaining a constant rate of flow of said stream, and controlling the rate of heat supplied to the fluidized bed to keep the temperature above the bed substantially constant.

7. A method according to claim 1 and in which said material is selected from the group consisting of kaolin, ball clay and calcium carbonate.

References Cited by the Examiner
UNITED STATES PATENTS

| | | | |
|---|---|---|---|
| 2,339,932 | 1/44 | Kuhl | 202—23 |
| 2,416,615 | 2/47 | Datin | 159—47 X |
| 2,439,384 | 4/48 | Fetzer | 159—47 X |
| 2,502,670 | 4/50 | Roberts et al. | |
| 2,561,392 | 7/51 | Marshall | 159—4 X |
| 2,561,393 | 7/51 | Marshall | 159—4 X |
| 2,561,394 | 7/51 | Marshall | 117—100 |
| 2,561,395 | 7/51 | Marshall | 159—4 |
| 2,635,684 | 4/53 | Joscelyne | 159—48 |
| 2,666,269 | 1/54 | Parry | 34—10 |
| 2,668,604 | 2/54 | Hogin | 34—56 X |
| 2,677,604 | 5/54 | Nelson. | |
| 2,800,955 | 7/57 | Honig et al. | 159—44 X |
| 2,938,233 | 5/60 | Nack et al. | 264—7 |

NORMAN YUDKOFF, *Primary Examiner.*

GEORGE D. MITCHELL, CHARLES O'CONNELL, BENJAMIN BENDETT, *Examiners.*